(12) United States Patent
Rastogi et al.

(10) Patent No.: US 12,634,293 B2
(45) Date of Patent: May 19, 2026

(54) AUTOMATED LEAST PRIVILEGE USING RISK AND USAGE

(71) Applicant: Andromeda Security, Los Altos, CA (US)

(72) Inventors: Gaurav Rastogi, San Francisco, CA (US); Murali Basavaiah, Los Altos, CA (US); Kevin Alejandro Roundy, El Segundo, CA (US); Kamalakannan Congevaram Muralidharan, Milpitas, CA (US)

(73) Assignee: Andromeda Security, Los Altos, CA (US)

( * ) Notice: Subject to any disclaimer, the term of this patent is extended or adjusted under 35 U.S.C. 154(b) by 0 days.

(21) Appl. No.: 19/236,071

(22) Filed: Jun. 12, 2025

(65) Prior Publication Data

US 2025/0385921 A1     Dec. 18, 2025

Related U.S. Application Data

(60) Provisional application No. 63/659,752, filed on Jun. 13, 2024.

(51) Int. Cl.
H04L 9/40     (2022.01)
(52) U.S. Cl.
CPC .................................. H04L 63/105 (2013.01)
(58) Field of Classification Search
None
See application file for complete search history.

(56) References Cited

U.S. PATENT DOCUMENTS

| | | | |
|---|---|---|---|
| 9,137,263 B2 | 9/2015 | Chari | |
| 9,648,036 B2 | 5/2017 | Seiver | |
| 10,198,597 B2 | 2/2019 | Ekambaram | |
| 10,230,734 B2 | 3/2019 | Seigel | |
| 11,640,470 B1 * | 5/2023 | Amar | G06Q 10/0635 |
| | | | 726/22 |
| 12,028,346 B1 | 7/2024 | Cannard | |
| 12,058,142 B2 | 8/2024 | Kumar | |
| 12,177,254 B2 | 12/2024 | Alaeddini | |
| 12,437,094 B2 | 10/2025 | Warshavsky | |
| 12,455,987 B2 | 10/2025 | Pu | |
| 2013/0298243 A1 | 11/2013 | Kumar | |

(Continued)

FOREIGN PATENT DOCUMENTS

| | | |
|---|---|---|
| CN | 110519241 | 11/2019 |
| CN | 112543176 | 3/2021 |

(Continued)

OTHER PUBLICATIONS

Dos Santos et al., A Dynamic Risk-based Access Control Architecture for Cloud Computing, IEEE Xplore, 2014, 9 Pages.

*Primary Examiner* — Brandon Hoffman
(74) *Attorney, Agent, or Firm* — Van Pelt, Yi & James LLP

(57)     ABSTRACT

A set of one or more permissions associated with an identity is determined. One or more risk metrics and corresponding usage associated with the one or more permissions associated with the identity are determined. Access associated with at least one permission from the set of one or more permissions associated with the identity is modified based on the one or more determined risk metrics and corresponding usage associated with the one or more permissions associated with the identity.

18 Claims, 4 Drawing Sheets

100

(56)         References Cited

U.S. PATENT DOCUMENTS

| | | | |
|---|---|---|---|
| 2014/0196104 A1 | 7/2014 | Chari | |
| 2016/0323288 A1 | 11/2016 | Peterson | |
| 2018/0033006 A1 | 2/2018 | Goldman | |
| 2019/0207953 A1 | 7/2019 | Klawe | |
| 2020/0259852 A1 | 8/2020 | Wolff | |
| 2021/0126912 A1 | 4/2021 | Maclean | |
| 2021/0150023 A1 | 5/2021 | Juncker | |
| 2021/0234856 A1 | 7/2021 | Rehnelt | |
| 2021/0281610 A1* | 9/2021 | Applegate-Swanson | .................... H04L 63/20 |
| 2022/0060507 A1 | 2/2022 | Crabtree | |
| 2022/0166762 A1 | 5/2022 | Srour | |
| 2023/0109755 A1 | 4/2023 | Qadri | |
| 2024/0179184 A1 | 5/2024 | Dayan | |
| 2024/0193519 A1 | 6/2024 | Holovacs | |
| 2024/0223567 A1 | 7/2024 | Istomin | |
| 2025/0126145 A1* | 4/2025 | Sapir .................. H04L 63/1416 | |
| 2025/0202899 A1 | 6/2025 | Chen | |
| 2025/0202910 A1 | 6/2025 | Kondapi | |
| 2025/0335558 A1 | 10/2025 | Alhomsi | |

FOREIGN PATENT DOCUMENTS

| | | |
|---|---|---|
| CN | 120200863 | 6/2025 |
| EP | 3571619 | 5/2021 |
| WO | 2001011452 | 2/2001 |
| WO | 2016067117 | 5/2016 |

* cited by examiner

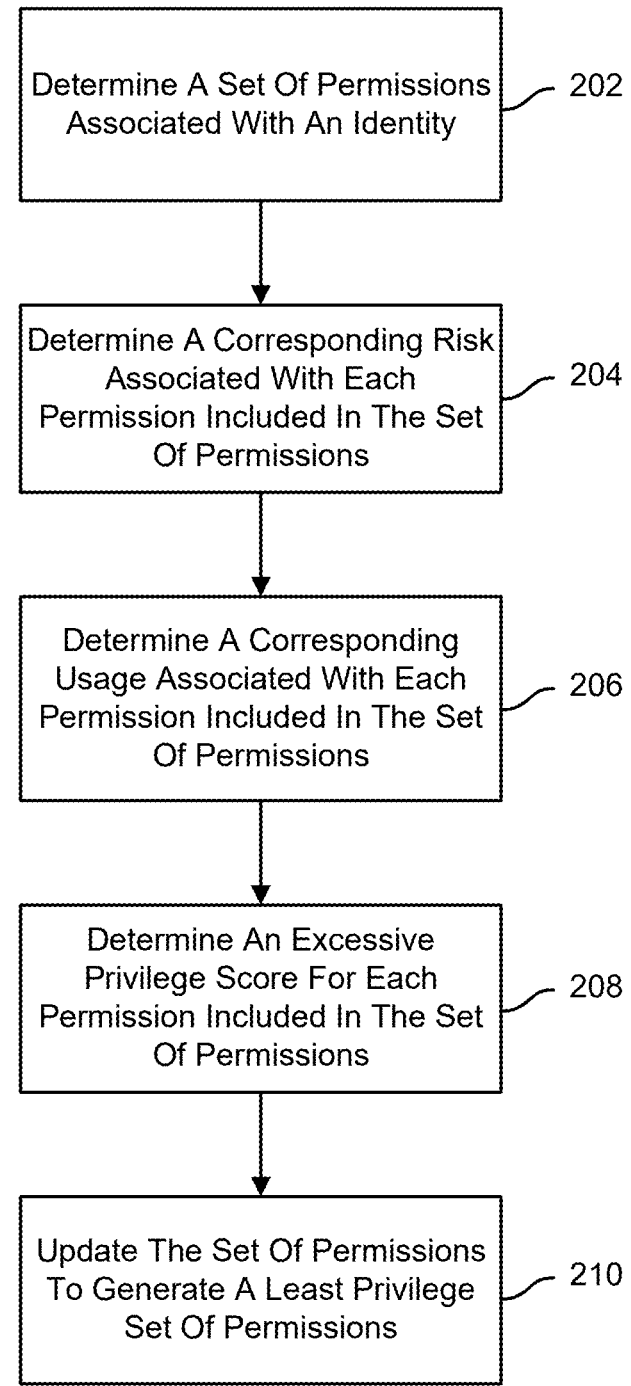

200

Determine A Set Of Permissions Associated With An Identity ⟋ 202

Determine A Corresponding Risk Associated With Each Permission Included In The Set Of Permissions ⟋ 204

Determine A Corresponding Usage Associated With Each Permission Included In The Set Of Permissions ⟋ 206

Determine An Excessive Privilege Score For Each Permission Included In The Set Of Permissions ⟋ 208

Update The Set Of Permissions To Generate A Least Privilege Set Of Permissions ⟋ 210

AUTOMATED LEAST PRIVILEGE USING RISK AND USAGE

CROSS REFERENCE TO OTHER APPLICATIONS

This application claims priority to U.S. Provisional Patent Application No. 63/659,752 entitled AUTOMATED LEAST PRIVILEGE USING RISK AND USAGE filed Jun. 13, 2024 which is incorporated herein by reference for all purposes.

BACKGROUND OF THE INVENTION

Cloud providers, such as Amazon Web Services (AWS), Google Cloud, and Microsoft Azure as well as SAAS applications commonly use Identity and Access Management (IAM) or Role-Based Access Control (RBAC) frameworks to manage user permissions. The number of available permissions is extensive. For example, AWS alone offers over 15K permissions across more than 400 services, and this number continues to grow rapidly as new features and services are introduced.

To simplify access management, cloud providers like AWS, Google Cloud, and Azure offer managed policies-predefined sets of permissions. These policies help reduce administrative burden by streamlining the assignment and removal of permissions. However, they also introduce significant drawbacks. Managed policies often contain thousands of permissions, many of which are unnecessary for the typical usage patterns of a given identity, thereby increasing the risk of over-permissioning. To simply permission management, administrators typically assign these policies to groups of identities with similar job functions, further amplifying the risk of granting excessive access.

Granting users or services more access than necessary introduces serious security and operational risks in cloud and enterprise environments. For example, unused permissions expand the attack surface, making it easier for malicious actors to exploit compromised identities. Such actors can leverage excessive permissions to move laterally, escalate privileges, or exfiltrate data. Even legitimate users may unintentionally access sensitive resources or services, and when combined with other misconfigurations, this can lead to full administrative control. Finally, unnecessary access to sensitive data (e.g., S3 buckets, databases) increases the risk of both accidental and malicious data exposure.

BRIEF DESCRIPTION OF THE DRA WINGS

Various embodiments of the invention are disclosed in the following detailed description and the accompanying drawings.

FIG. 2 is a flow diagram illustrating a process to generate a least privilege set of permissions in accordance with some embodiments.

DETAILED DESCRIPTION

Figure 1:
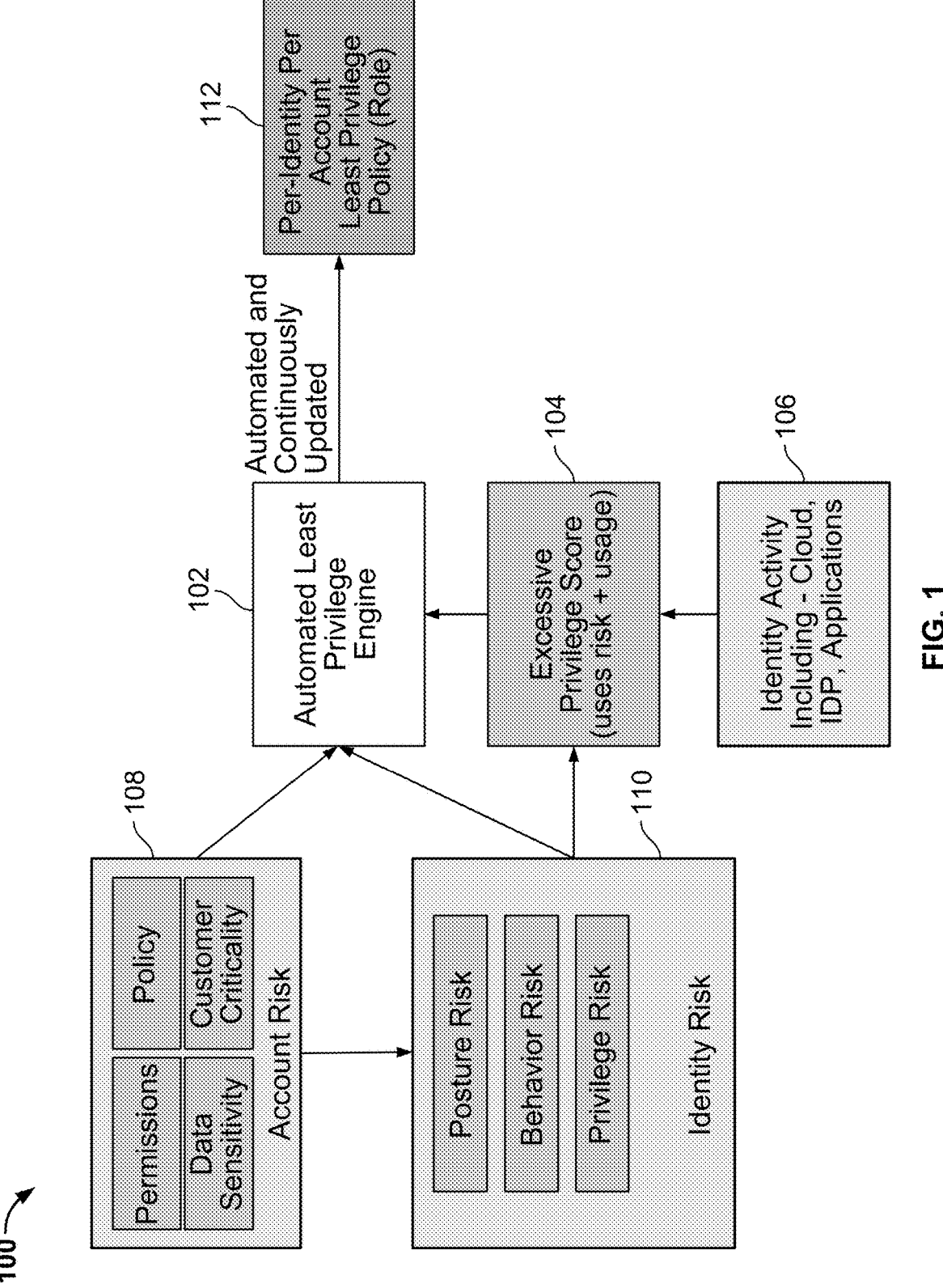
FIG. 1 is a block diagram illustrating a system to automate least privilege using risk and usage in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

If an identity's account—such as a cloud user or service account—is compromised by a malicious actor, it is critical to quantify the risk posed by the permissions granted to that identity. Accurate risk measurements enable timely and effective security responses to prevent theft or manipulation of associated cloud assets, including sensitive data, source code, and infrastructure. Due to current shortcomings in identity risk management, the likelihood of such compromises remains high; in fact, over 70% of cloud breaches are linked to identity-related incidents.

To address this problem, the systems and methods disclosed herein implement the principle of least privilege, ensuring that users or systems are granted only the minimum permissions necessary to perform their tasks. This not only reduces the attack surfaces by limiting the number of exploitable permissions, but also mitigates impact in the event of a compromise. The systems and methods evaluate both permission usage and risk to determine which permissions should be retained. By assigning only the necessary and low-risk permissions, organizations can effectively reduce the likelihood of data breaches and operational disruptions. Quantifiable assessments of the risks associated with the permissions granted to an identity-whether human or service—are critical for enabling effective security responses that protect the assets linked to an identity's account from theft or tampering. Without measuring these risks, the extent of a system's exposure cannot be accurately determined. By assessing risk, organizations can ensure that permissions granting access to high-value assets are tightly controlled, thereby reducing the likelihood of data breaches or operational disruptions.

To facility risk and usage aware privilege management, the systems and methods disclosed herein compute a corresponding excessive privilege score for one or more permissions assigned to an identity. This score indicates whether a permission is unnecessary, either because it is never used, or because it is granted on a continuous basis but only needed sporadically. Permissions with scores exceeding a defined threshold may be flagged for removal, while those equal to or below the threshold may be retained.

Not all "excessive privilege" is equal, some permissions are much more dangerous than others. The excessive privilege score for a permission may be based in part on the permission's "blast risk" or a "privilege risk metric" which represents the amount of damage the permission can do if an identity with access to the permission were to be compromised.

The excessive privilege score for a permission may be based in part on a "posture risk metric," which is based on characteristics an identity that make it more or less likely to be compromised. Examples of high-posture-risk identities include accounts belonging to terminated employees, identities without multi-factor authentication, or those with weak or publicly exposed passwords.

The excessive privilege score for a permission may be based in part on a "behavior risk metric," which is based on aspects of actions performed by an identity. The behavior risk metric can measure how likely it is that an account is currently compromised. Behavior risk may be represented by sequences of anomalous events, but also by unusual event metadata indicating such things as access to an account from an unexpected location or device, or at an irregular time or at irregular volume.

Accurate risk metrics are vital not only for monitoring but also for enabling automated enforcement mechanisms. For instance, the risk of a policy can be managed by identifying and removing high-risk permissions, or by suspending access to sensitive permissions unless granted on a just-in-time (JIT) basis, subject to approval and validation. Policies associated with high-risk behavior can be placed under heightened scrutiny, with behavioral anomaly detection systems triggering revocation of specific permissions or entire policies when necessary.

By assigning concrete risk scores to permission sets, the system and methods enable both automated mitigation of account compromise and more targeted administrative oversight. However, scoring policies remains challenging due to the complexity and variability of cloud environments. First, cloud providers offer over 1,000 managed policies, and tenants may define unlimited custom permission sets. Second, these policies can include any combination of over 10,000 available permissions, each with its own risk profile. Third, the true risk of a policy depends heavily on how the cloud environment is used—for example, what data is hosted, which services are active, and how critical the infrastructure is. Therefore, the system supports a hybrid approach in which tenants benefit from expert risk assessments and peer-informed consensus, while also being able to customize risk scores based on their specific priorities and usage patterns.

FIG. 1 is a block diagram illustrating a system to automate least privilege using risk and usage in accordance with some embodiments. In the example shown, system 100 may be implemented on one or more servers, one or more computers, one or more virtual machines, one or more containers, or cloud-native environments. System 100 may be implemented as part of a privilege access management platform, an identity governance and administration system, a just-in-time access tool, a cloud infrastructure entitlement management, or a policy-based access control engine.

In order to understand risk through authorization/permissions, one has to consider a plurality of factors, such as the blast impact due to the identity's compromise, the likelihood of that an identity with permissions will be compromised, and/or the likelihood that an identity is already compromised.

System 100 includes an automated least privilege engine 102. The automated least privilege engine 102 is configured to grant or deny permissions already assigned to an identity associated with a user. In some embodiments, the permissions already assigned to an identity include an initial or default set of permissions. In some embodiments, the permissions already assigned to an identity include a current set of permissions. A set of permissions 112 are granted on a per-identity per account least privilege policy basis. Permissions granted to an identity are determined to be excessive when the system forecasts that they are unlikely to be needed at the present time and near future, and/or when the privileges are determined to be too risky for the context in which they have been granted to the user. Risk may be measured in terms of the damage that the permission could cause if in the wrong hands (i.e., its blast risk), the riskiness of the identity to whom the permission has been granted (i.e., its posture), and/or the riskiness of granting the permission based on its being in excess of the user's needs.

Automated least privilege engine 102 is configured to determine whether to grant or deny a permission from a set of permissions granted to an identity associated with a user based on the permission's excessive privilege score 104, an account risk 108 associated with the identity, and an identity risk 110 associated with the identity. Excessive privilege score 104 represents the proportion of granted permissions that are either rarely used or pose elevated risk and thus should be removed. This score may be expressed as a percentage: the number of permissions granted to the user that fall outside their Least Standing Privilege (LSP) set divided by the total number of permissions assigned.

The excessive privilege score 104 associated with a permission is based on risk associated with the identity and usage associated with the identity. The risk associated with the identity is based on account risk 108 and an identity risk 110. Account risk 108 is based on a plurality of factors, such as the permission risk, a policy risk associated with the permission, the sensitivity of the data involved with the permission, and the criticality of the associated service or account.

Account Risk

Permission Risk

The permission risk score is a numeric value that represents how risky a specific permission is if misused or compromised. This score is not static—it is calculated based on a variety of contextual, behavior, and technical risk factors. These factors include, but are not limited to, access level, cloud service criticality, service category risk factors, attack prevalence/threat intelligence, deprecation status, privilege escalation potential, and/or machine learning/expert models.

Access Level

One key factor influencing a permission's risk score is its access level. Each level of access can be assigned its own unique risk weight or risk score. For example, the access levels specified by AWS are the following: List, Tagging, Read, Write, Permission Management. A corresponding risk weight or risk score may be assigned to each of the access levels. For example, permission management access might have a higher risk factor than read-only access because it can make more impactful changes or expose more data. These access levels may be further refined, and a corresponding risk score may be attached to the refined access levels.

The access levels that are provided by cloud providers may be refined by subdividing access levels to achieve the following access-level mapping between the access levels defined by cloud providers and the access levels that we define, and into which we divide permissions:

List→List (this includes reading tags)

Tagging→WriteTag, DeleteTag

Read→ReadData, ReadMetadata

Write→WriteMetadata, Create, WriteData, DeleteData, Delete

PermissionsManagement→PermissionsManagement

For the purposes of these access levels, metadata refers to non-sensitive configuration and contextual data, whereas data represents the core contents of data and database files, which is potentially very sensitive. These refined access levels can be inferred automatically using textual analysis of permission names and their documentation to identify keywords and phrases that correlate strongly with specific Access Level categories. In some embodiments, a large language model is utilized to assign an access level to a permission.

Cloud Service Criticality

Another factor affecting the permission risk score is the criticality of the cloud service to which the permission applies. This criticality reflects the potential impact on the organization if access to the service were misused, compromised, or over-provisioned. The risk score is adjusted based on how essential the service is to business operations, the type of data it processes, and the potential for misuse to cause widespread damage.

For example, a permission that grants access to Amazon S3, which is commonly used for storing structured and unstructured data-including customer records, backups, and logs—may be assigned a moderate to high risk score depending on whether the S3 buckets contain sensitive or regulated data.

Permissions related to Amazon EKS (Elastic Kubernetes Service), which orchestrates containerized workloads and manages application infrastructure, may carry even higher risk due to the potential for attackers to control application deployment, scale malicious workloads, or move laterally within the environment.

In contrast, permissions associated with Amazon IAM (Identity and Access Management) are often assigned the highest risk scores, as they control who can assume roles, modify access policies, and grant or revoke permissions across the entire cloud environment. Misuse of IAM permissions can result in privilege escalation, credential abuse, or full account takeover.

Thus, the business impact, data sensitivity, and administrative scope of the associated service are all considered when calculating how much risk a given permission poses. This ensures that permissions tied to more critical cloud services are evaluated with greater scrutiny and assigned appropriately higher risk scores.

Service Category Risk Factors

In some embodiments, cloud services are grouped into service categories based on their functionality, business impact, or security sensitivity. Each service category is then associated with a corresponding risk score factor, which reflects the potential risk of permissions that apply to services within that category. This allows the system to scale risk scoring consistently across a large and diverse set of cloud services.

For example, the IAM (Identity and Access Management) service may be placed in a "Permissions Management" category, since it governs the ability to create, modify, and assign roles and policies. Because permissions in this category can be used to escalate privileges, delegate access, or disrupt account-wide security controls, the Permissions Management category is assigned a high risk multiplier. Any permission that applies to a service within this category will inherit an elevated risk score as a result.

Other example categories might include:

"Storage Services" (e.g., Amazon S3, Azure Blob Storage)—where risk depends on the sensitivity of the data typically stored "Compute and Orchestration" (e.g., Amazon EC2, AWS Lambda, Kubernetes)—where risk may vary based on potential for resource creation or lateral movement "Monitoring and Logging" (e.g., Amazon CloudWatch, Azure Monitor)—which may carry lower risk, but could increase if logs contain sensitive data "Billing and Cost Management"—which may impact financial exposure "Networking and Identity Federation"—where misconfigurations can expose entire environments to public networks or external identities By assigning risk weights at the category level, the system can simplify and standardize permission risk scoring, while still accounting for the criticality of the underlying service. This also enables scalability, as new cloud services can be mapped to existing categories and immediately inherit baseline risk characteristics, without requiring individual scoring from scratch.

Attack Prevalence/Threat Intelligence

In some embodiments, the risk score associated with a permission is increased if the permission is observed more frequently in attack scenarios than during normal business operations. These attack scenarios may include, but are not limited to, information from publicly reported vulnerabilities (e.g., CVEs), patterns identified in security exercises, such as capture-the-flag (CTF) competitions, and insights from automated vulnerability scanning tools, such as CNAPP tools. The risk adjustment may be based on the odds ratio or relative likelihood of the permission appearing in malicious contexts vs benign usage. Additionally, in some embodiments, organizations may label certain accounts as compromised for a period of time, and attack patterns may be extracted from the activity logs associated with those compromised accounts to further refine risk scoring.

Deprecation Status

In some embodiments, a permission—or the cloud service to which the permission applies—may be designated as "deprecated", indicating that it is outdated, no longer recommended for use, or scheduled for removal by the cloud provider. This deprecated status introduces additional risk because such permissions may lack ongoing security updates, suffer from limited visibility or monitoring, or be prone to misconfiguration due to outdated documentation or tooling. As a result, the deprecated status is treated as a risk-increasing factor in the overall permission risk score, ensuring that permissions tied to unsupported or legacy services are flagged for review, reduction, or removal.

Privilege Escalation Potential

In some embodiments, permissions are evaluated for their potential to enable privilege escalation, meaning they could be misused to grant an identity or role access to resources or actions beyond its originally intended scope. This includes permissions that allow users to create or modify roles, assign broader policies, assume other identities, or interact with services that can indirectly elevate access rights. For example, a permission that enables updating IAM policies, assuming privileged roles, or modifying access control configurations can be leveraged by an attacker to gain higher levels of access within the environment. Because these actions pose a significant security threat, privilege escalation potential is treated as a high-risk factor and incorporated into the permission's overall risk score.

Machine Learning/Expert Models

In some embodiments, additive or multiplicative risk factor scores—which represent the influence of individual attributes on the overall permission risk score—are treated as feature weights within a machine learning model. These weights determine how much each factor (e.g., access level, service criticality, privilege escalation potential) contributes to the final risk score. Over time, the machine learning model may dynamically adjust these weights based on observed patterns in real-world data, such as historical access behavior, known attack vectors, or outcomes from security incidents. This enables the system to continuously refine and improve risk scoring accuracy by learning which factors are most predictive of actual security risk.

In some embodiments, additive or multiplicative risk factor scores—which quantify the contribution of specific attributes to the overall permission risk score—are initially defined as static parameters based on expert judgment, such as security analysts or cloud architects. These experts assign baseline values that reflect the perceived severity or importance of various risk factors, such as access level, service criticality, or historical misuse. Over time, these initial values are subject to adjustment by an optimization algorithm, which fine-tunes the parameters based on empirical data, feedback loops, or performance metrics. The optimization process may involve techniques such as gradient descent, reinforcement learning, or other numerical methods to increase or decrease parameter weights in a way that improves the accuracy, consistency, or predictive value of the overall risk scoring model. This hybrid approach allows the system to combine domain expertise with data-driven refinement for more precise and adaptive permission risk assessments.

In some embodiments, a numeric score that measures the risk posed by a permission is determined based on one or more properties of the permission that influence the blast risk metric of the permission. These risk factors may affect risk scores by adding or subtracting to the permission's risk score, or may multiplicatively increase or decrease the risk of the underlying permission.

Policy Risk

In some embodiments, account risk is closely tied to the policy risk associated with the permissions granted to the account. Each policy assigned to an account may contain one or more permissions with varying levels of inherent risk. When an account inherits policies that include high-risk or overly permissive actions, the account's overall risk posture increases accordingly. To mitigate this, the policy risk—and by extension, the account risk—can be reduced by removing or restructuring policies to exclude dangerous permissions, or by applying just-in-time (JIT) access controls that grant temporary access to sensitive permissions only upon validation of a legitimate need. In some embodiments, behavioral anomaly detection mechanisms are configured to monitor accounts that use high-risk policies; upon detecting suspicious activity, such systems may revoke access to the entire policy or selectively disable specific high-risk permissions. Furthermore, contextual information about the account's role (e.g., whether it is used by a cloud administrator or a developer) informs whether a given permission is appropriate or excessive within that policy. A permission that is acceptable in a high-privilege administrative context may be deemed excessive and increase policy and account risk when assigned to an account in a less critical role.

Data Sensitivity

In some embodiments, account risk is influenced by contextual information about the sensitivity of the data stored within the account. If an account is determined to contain or have access to sensitive data, any associated permissions may be classified as excessively risky, thereby elevating the overall account risk posture. The assessment of whether a permission increases account risk may consider not only the actual presence of sensitive data, but also whether the permission could enable access to sensitive data if such data were to exist. In some embodiments, the presence of sensitive data within an account is inferred through analysis of system logs-such as frequent data access patterns or a high volume of stored data files-which serve as indicators of the account's data sensitivity and operational criticality.

Customer Criticality

In some embodiments, the criticality of an account—and thus its associated account risk—is dynamically inferred by analyzing log data that reflects the account's operational role and importance within the system. This analysis may consider multiple factors, including the frequency and volume of activity associated with the account, the types of actions performed (e.g., administrative changes, data processing, or workflow approvals), and the number and nature of customer identities or other critical systems that interact with the account. For example, if log data shows that the account is heavily accessed by high-value customers, involved in transactional processing, or frequently interacts with sensitive data pipelines, the account may be classified as business-critical. This inferred criticality contributes directly to the overall account risk posture, which influences the severity of potential security incidents involving the account and may inform enforcement of additional security controls, monitoring, or access restrictions.

Identity Risk

Identity risk 110 is based in part on a posture risk metric, a behavior risk metric, and a privilege risk metric. These risk metrics may be determined based on information included in account risk 108.

Posture Risk Metric

The posture risk metric provides a quantifiable measure of the overall security risk associated with the current configuration of an identity. The posture risk metric associated with an identity is based on a plurality of factors, such as identity lifecycle risk, functional exposure risk, transitive trust risk, identity hygiene risk, the presence of standing privileges, the scope of permissions and associated blast radius, privilege escalation paths, absence of security controls, dormant or unused access, access via trusted roles or policies, and relevant environmental context.

Identity Lifecycle Risk

Identity lifecycle risk reflects the current state of an identity within the organization (e.g., whether the identity is associated with a new hire, an active employee, someone on leave, or a recently terminated user). The employment status of a user, such as being placed on administrative leave or having recently joined the organization, influences posture risk due to potential gaps in provisioning, access validation, or offboarding.

Functional Exposure Risk

Functional exposure risk evaluates posture risk based on the identity's role and business function within the organization. Certain roles (e.g., IT, finance, security, DevOps) are inherently more sensitive due to their access to critical infrastructure or sensitive data, elevated privileges (e.g., admin or root access), and exposure to regulatory or compliance obligations.

Transitive Trust Risk

Transitive trust risk captures the elevated risk posed by non-human identities (e.g., service accounts, bots, cloud functions) that inherit permissions or context from human identities. This includes the human identity that created the non-human identity or the one whose permissions indirectly authorize its actions. If the originating human identity has a high risk posture (e.g., poor security hygiene, excessive privileges), then the associated non-human identity inherits the elevated posture risk.

Identity Hygiene Risk

Identity hygiene risk refers to how securely an identity is maintained over time. Non-human identities that remain inactive yet retain privileges, such as unused service accounts, roles, or tokens, are particularly risky, as they may go unnoticed and unmonitored, creating attack surfaces for exploitation. Monitoring the recency or regularity of use helps determine whether the identity's permissions should be pruned or revoked.

Additional posture risk factors include:

Standing privileges, which are persistent high-risk permissions (e.g., admin, write, delete) granted regardless of actual need;

Permission scope and blast radius, which measure the breadth and criticality of accessible resources, systems, or environments. The more critical or widespread the access, the higher the posture risk;

Privilege escalation paths, which exist when an identity can gain elevated privileges through direct or indirect means;

Lack of security controls, such as missing multi-factor authentication, weak or non-rotated credentials, or the use of shared accounts;

Unused or dormant access, referring to permissions that are no longer actively used but remain in effect;

Access via trusted roles or policies, which indirect access granted through role assumptions or policy links may not be properly tracked; and Environmental context, which considers whether the identity operates in sensitive areas, such as production environments or high-risk departments like finance or security operations.

Behavior Risk Metric

The behavior risk metric provides a quantifiable measure of how likely it is that an account is currently compromised. It is derived from various signals, including anomalous login patterns, unusual access behavior, abnormal activity volume or frequency, irregular event sequences, deviations from historical baselines, contextual metadata, and external threat intelligence. Anomalous login patterns may involve access from unusual geographic locations or IP addresses, new or unrecognized devices, atypical login times, or sudden changes in login frequency. Unusual access behavior includes accessing sensitive or rarely used resources, escalating privileges not normally used, or deviating from typical departmental or regional access patterns. Abnormal activity volume and frequency may involve spikes in data transfers, rapid execution of API calls, or bulk file creation or deletion. Unusual event sequences include behaviors such as a login immediately followed by a data export and logout, or compressed timing between sensitive operations. In some embodiments, the context includes the sequence of permissions used to perform actions that precede and follow the permission in question. In some embodiments, the context of the permission sequence is measured based on the normality or abnormality of the sequence, measured by modeling the probability of the sequence, using such techniques as: Markov Models, Hidden Markov Models, and neural network architectures designed for modeling sequence probability, such as recurrent neural networks, Long-Term Short Term networks, and transformer—or attention-based networks. In some embodiments, the sequence's probability is measured in the context of an identity's past behavior. In some embodiments, the sequence's probability is measured in the context of all of the behavior previously observed in a cloud account.

Historical baseline deviation refers to departures from the user's own behavioral norms or those of similar peers. A user included in a peer group likely should be given the same permissions as other user(s) included in the peer group. Peer-group modeling may be used for new users that join a company, an organization, a team, etc. Peer groups can be based on the notion of groups defined for purposes of permissions management in cloud providers, organizational management structures (e.g., on the same team), on users with similar job titles, on users that share similar sets of permissions, and on users that have similar access patterns and behaviors when using the cloud. Using peer-group modeling enables a user to be given permission(s) without having behavioral history from which permissions are given. These peer groups are determined based on the context of policy, account and user where access is being requested. For example, if a user is part of a group and that group does not have access to the policy, then the group is not used for peer analysis. Environmental or contextual anomalies may include unexpected device or browser characteristics, use of anonymizing services, or shifts in network context. Finally, external threat intelligence may flag known indicators of compromise, such as suspicious IPs or correlations with threat feeds. By aggregating these factors, the behavior risk metric serves as a dynamic indicator of potential account compromise.

Privilege Risk Metric

The privilege risk metric provides a quantifiable measure of the potential scope and severity of impact if a particular privilege (or set of permissions) is abused-either by a malicious actor or through accident/misuse. It combines elements of privilege breadth (what the privilege allows access to) and reach (how far the privilege can affect systems, data, or users). The privilege risk metric is based on a plurality of factors, such as access scope, privilege type, propagation risk, data sensitivity, service or system criticality, network or account boundary crossing, or usage frequency and necessity. Access scope refers to whether the privilege grants access to a wide range of resources, systems, or environments (e.g., production vs. dev/test). Privilege type refers to the actions permitted by the privilege. For example, admin, delete, write privileges carry higher black risk than read or list privileges. Propagation risk refers to the ability of a privilege to escalate access (e.g., permission to assign roles or modify IAM policies). Data sensitivity refers to whether the privilege allows access to sensitive, regulated, or business-critical data. Service or system criticality addresses whether the privilege affects critical systems (e.g., infrastructure, CI/CD pipelines, authentication services). Network or account boundary crossing refers to privileges that enable lateral movement between services, accounts, or networks, thereby increasing blast risk. Lastly, usage frequency and necessity consider the risk posed by privileges that are rarely used but remain continuously active and thus vulnerable if compromised.

Usage

The usage associated with the permission is based on identity activity 106. Identity activity 106 may include cloud event log history, which is used to determine what permissions the identity has used in the past to predict what permissions are most likely to be used in the present and future. Identity activity 106 may include identity provider (IdP) activity, such as authentication event logging (e.g., login success/failure, time of login, IP address and geolocation, device/browser fingerprint, MFA usage status), session and access tracking (e.g., session duration and frequency, resource access patterns, SSO token issuance and use), risk scoring and anomaly detection (e.g., flagging unusual login times or volumes, detecting impossible travel, assigning risk scores to sessions or identities), behavior baselines (e.g., typical login times, common locations or devices, normal applications used), and/or policy enforcement (e.g., conditional access policies, session expiration or re-authentication triggers, Just-in-Time access decisions). Identity activity 106 may include actions performed by an identity (human or non-human) within an application after authentication, such as accessing data, modifying settings, downloading riles, or invoking APIs.

Automated Least Privilege Engine 102 is configured to determine an LSP set for an identity based, in part, on the account risk 108, the identity risk 110, and the excessive privilege score 104. The LSP set is comprised of low-risk permissions that are frequently used by the user. These permissions are retained, while all other permissions assigned to the user are either excluded or flagged for removal to minimize breach risk. In some embodiments, a permission is classified as "low risk" based on factors, such as its access level, the criticality of the associated service or account, the sensitivity of the data involved, the risk of privilege escalation, the potential to expose sensitive information or critical resources, and/or its overall privilege risk metric.

When generating a least-privilege role for an identity, automated least privilege engine 102 may exclude permissions associated with activities performed from anomalous locations. For example, if a user logs in from London—a location not typically associated with that user—any permissions granted as a result of actions taken from that location may be excluded from the user's long-term permission set. However, if the user regularly operates from multiple known locations (e.g., San Francisco and London), and the system recognizes this as a normal travel pattern, such permissions will be retained. If ongoing activity continues to originate from a location that remains anomalous over time, the system may ultimately remove the associated permissions to enforce a least-privilege configuration.

In some embodiments, regression-based models, such as exponentially weighted moving average, Holt-Winters and ARIMA models, are used by automated least privilege engine 102 to predict the probability that individual permissions will be needed by the identity in the future. If the predicted probability of future use falls below a threshold, automated least privilege engine 102 may remove the corresponding permission from the identity's active permission set.

In some embodiments, the risk of individual permissions are combined to create an aggregate score for a set of permissions 112 that is managed as a unit and can be assigned to an identity. In some embodiments, the risk of the aggregate set of permissions is based on the Lp Norm for some value of p, of the permissions in the set, where the Lp norm is defined as the pth root of the risk score of each permission in the set, each of which has been raised to the pth power prior to conducting the summation. I.e., for a set of "n" permission risk scores "r", the Lp norm=$(r\_1\char`^p+ r\_2\char`^p+ \ldots r\_n\char`^p)\char`^1/p$. In some embodiments, the risk of the aggregate set of permissions is based on the maximum risk score of any permission in the set. In some embodiments, the risk of the aggregate set of permissions is based on the cardinality of the permission set. In some embodiments, the context of the criticality of the account in which the permission set is granted is considered as a factor that increases or decreases the risk of the account. In some embodiments, the permission sets that an identity has access to is determined not only by direct grants of permission sets to the identity, but also by inferred access through trust relationships between policies and roles that the identity can assume, thereby gaining access to additional policies. For example, if Identity1 has direct access to PermissionSet1, which pertains to a database, and Identity1 should be enabled to perform backups of the database using the permissions in PermissionSet2, PermissionSet1 will be trusted to assume a role that enables it to use PermissionSet2. Thus, by following these assumed role relationships, the full chain of indirect permission sets to which Identity1 has direct or indirect access are identified, and they are used to compute the aggregate set of permissions to which Identity1 has access.

In some embodiments, the identity risk 110 in an account is based on the risk score of the aggregate set of permissions included across any and all permission sets to which the user has access in the account. In some embodiments, the notion of the criticality of the account is used as a multiplier to the overall aggregate risk score of permissions in the account. In some embodiments, the risk of an identity is measured as an aggregate risk score over all accounts to which the user has access, with the risk of each account being computed based on the risk score of the aggregate set of permissions included across any and all permission sets to which the user has access in the account and optionally using the notion of the criticality of the account as a multiplier to the overall aggregate risk score of permissions in the account. In some embodiments, the aggregation method used takes into account the riskiest accounts and the riskiest permissions in those accounts, as well as the total number of accounts and permissions in those accounts, as accomplished by taking the Lp Norm across accounts. In some embodiments, the risk of a provider is determined by an aggregation method that takes into account its riskiest identities as well as the number of identities that have access to the account, as can be accomplished by taking the Lp Norm across all identities. In some embodiments, certain privileged identities—such as administrators or system—level service accounts—can be designated as acceptable risks and excluded from the provider risk calculation. In such cases, the aggregate risk of an account remains stable even when administrators monitor or interact with it, thereby reducing false positives and avoiding unnecessary high-risk alerts. Finally, in some embodiments, the risk of a cloud tenant is defined as the maximum risk among all of its underlying cloud providers.

In some embodiments, the risk posture of the aggregate set of permissions 112 is based on contextual factors, including the criticality of the account in which the permission is accessed, the sensitivity of the data in the account, and the role of the user accessing those permissions. The assessment of whether a permission is excessively risky considers not only whether sensitive data is present in the account, but also whether the permission could potentially be used to access such data, should any such data exist.

In some embodiments, the risk of individual permissions are combined to create an aggregate score for a set of permissions 112 that is managed as a unit and can be assigned to an identity. In some embodiments, the raw scores produced by aggregating a set of permission scores, are then normalized into a set range of scores such as 0-1 or 0-100, through the use of a normalization function. In some embodiments, the normalization is guided by a set of scores assigned to some permission sets in the normalized range, which serve as suggestions of appropriate scores and serve to parameterize the normalization function. In some embodiments, normalized scores serve as fixed anchor points, and a monotonically increasing interpolation function is used to infer appropriate normalized scores for intermediate raw scores. In some embodiments, algorithms like Fritsch-Butland or linear extrapolation are used to obtain a smooth monotonically increasing interpolation function, and which serves as the interpolation algorithm.

In some embodiments, normalized scores are treated as guidelines for the curve rather than as fixed anchor points, and a smooth curve algorithm is used to extrapolate between the points. In some embodiments, algorithms, such as a Bezier algorithm, with controls to ensure monotonicity, are used for extrapolation. In some embodiments, the parameters of a single function such as the logistic function, are optimized to achieve a mapping between raw scores and normalized scores in such a manner as to minimize the aggregate error between the normalized scores that serve as guiding points for the algorithm. In some embodiments, the risk factors specified in some or all previous claims are each attached to a loss function and are formulated as parameters that either modify individual permissions, or to the permission set as a whole, or that serve as parameters for the normalization function, or that serve as guiding points for the normalization function, and these parameters are adjusted by gradient descent function to achieve parameter settings that minimize the aggregate loss of the system, wherein the loss is measured by the error on the scores produced by the scoring function on labeled examples, together with loss penalties associated with modifications to the initial weights assigned to individual parameters of the risk scoring function.

Automated Least Privilege Engine 102 is configured to maintain and update the set of permissions 112. The set of permissions 112 may be updated daily, weekly, monthly, yearly, or any other time interval. In some embodiments, automated least privilege engine 102 is configured to update the set of permissions 112 in response to a user command. In some embodiments, automated least privilege engine 102 is configured update the set of permissions 112 in response to an event (e.g., security breach).

In some embodiments, sets of permissions are either scored directly by cloud tenants on a normalized scale, or adjusted by customers adjust who fine-tune the algorithmically generated scores. Automated least privilege engine 102 may utilize crowd-sourced risk estimates to refine the parameters of the risk scoring function. These parameters are optimized to map raw scores to normalized scores in a way that minimizes the overall error between the normalized scores and the intended reference values that guide the algorithm.

System 100 further includes a user-interface by which customers can see a representation of risk scores for well-known managed policies that serve as guidelines for the risk scoring algorithm as a whole, and based on which system 100 can extrapolate the risk scores that should be assigned to all other permission sets. In some embodiments, the risk scores can be adjusted by the customer, which will lead to a re-optimization of the normalization function parameters, and to the underlying risk factors, to achieve a good fit to the individual customer's needs. In some embodiments, the aggregate feedback from customers leads to an industry consensus to which we optimize the default parameters of the overall system. In some embodiments, the user interface is a table of permission sets with the name of the permission set and an editable normalized score, and which optionally allows customers to add a new permission set row to the table and to specify its desired score. In some embodiments, the user interface puts the normalized scores for permission sets on a slider that represents the range of all possible scores, so that customers are able to adjust scores up and down by moving permission sets on the slider. In some embodiments, customers are allowed to make adjustments to normalized scores, but where the edits are restricted to ensure that the resulting normalization function is monotonic in its nature.

FIG. 2 is a flow diagram illustrating a process to generate a least privilege set of permissions in accordance with some embodiments. In the example shown, process 200 may be implemented by an automated least privilege engine, such as automated least privilege engine 102.

At 202, a set of permissions associated with an identity is determined. In some embodiments, the set of permissions associated with the identity is an initial or default set of permissions. An identity may be assigned the set of permissions based on one or more roles and/or attributes associated with the identity. The set of permissions may include one or more unused or infrequently used permissions. The set of permissions may include one or more non low-risk permissions (e.g., medium or high risk permissions).

In some embodiments, the set of permissions associated with the identity is a previously generated least privilege set of permissions. Process 200 may be periodically implemented (e.g., daily, weekly, etc.), in response to a user command, or in response to an event (e.g., security breach).

At 204, a corresponding risk associated with each permission included in the set of permissions is determined. A risk associated with a permission is based in part on an account risk associated with the identity and an identity risk associated with the identity. The account risk is based on a plurality of factors, such as permission risk, policy risk, data sensitivity associated with the permission, and customer criticality.

The identity risk associated with the entity is based in part on a posture risk, a behavior risk, and a privilege risk. The posture risk is a metric that provides a quantifiable measure of the overall security risk associated with the current configuration of an identity. The behavior risk is a metric that provides a quantifiable measure of how likely it is that an account is currently compromised. The privilege risk is a metric that provides a quantifiable measure of the potential scope and severity of impact if a particular privilege (or set of permissions) is abused—either by a malicious actor or through accident/misuse.

At 206, a corresponding usage associated with each permission included in the set of permissions is determined. The usage associated with a specific permission is derived from identity activity. Identity activity may include cloud event log history, which is analyzed to determine whether the permission has been exercised in the past-helping to predict the likelihood that it will be used in the present or future. Additionally, identity activity may encompass IdP data, such as authentication event logs (e.g., login success/failure, timestamp, IP address, geolocation, device or browser fingerprint, MFA usage), as well as session and access patterns (e.g., session length, frequency, resource access behavior, SSO token usage). Risk and anomaly indicators-such as abnormal login times, impossible travel events, or elevated session risk scores—may also be factored in. The automated least privilege engine may further consider behavior baselines (e.g., typical login schedules, common devices or locations, standard applications) and policy-driven signals (e.g., conditional access triggers, session expirations, Just-in-Time access decisions). Finally, identity activity may include post-authentication actions taken within applications—such as accessing resources, modifying configurations, downloading files, or invoking APIs—to assess whether the specific permission was or is likely to be exercised.

At 208, an excessive privilege score for each permission included in the set of permissions is determined. The excessive privilege score associated with a permission is based on risk associated with the identity and usage associated with the identity. The risk associated with the identity is based on an account risk and an identity risk. This score indicates whether a permission is unnecessary, either because it is never used, or because it is granted on a continuous basis but only needed sporadically. Permissions with scores exceeding a defined threshold may be flagged for removal, while those equal to or below the threshold may be retained.

At 210, the set of permissions is updated to generate a least privilege set of permissions. In some embodiments, one or more permissions are removed from the set of permissions. In some embodiments, the set of permissions is maintained because it already represents the least privilege configuration, and there has been no change in the identity's risk or usage since the last evaluation of risk, usage, and excessive privilege scores for that permission set. In some embodiments, a permission access is modified from permitted to permitted with JIT access.

Figure 3:
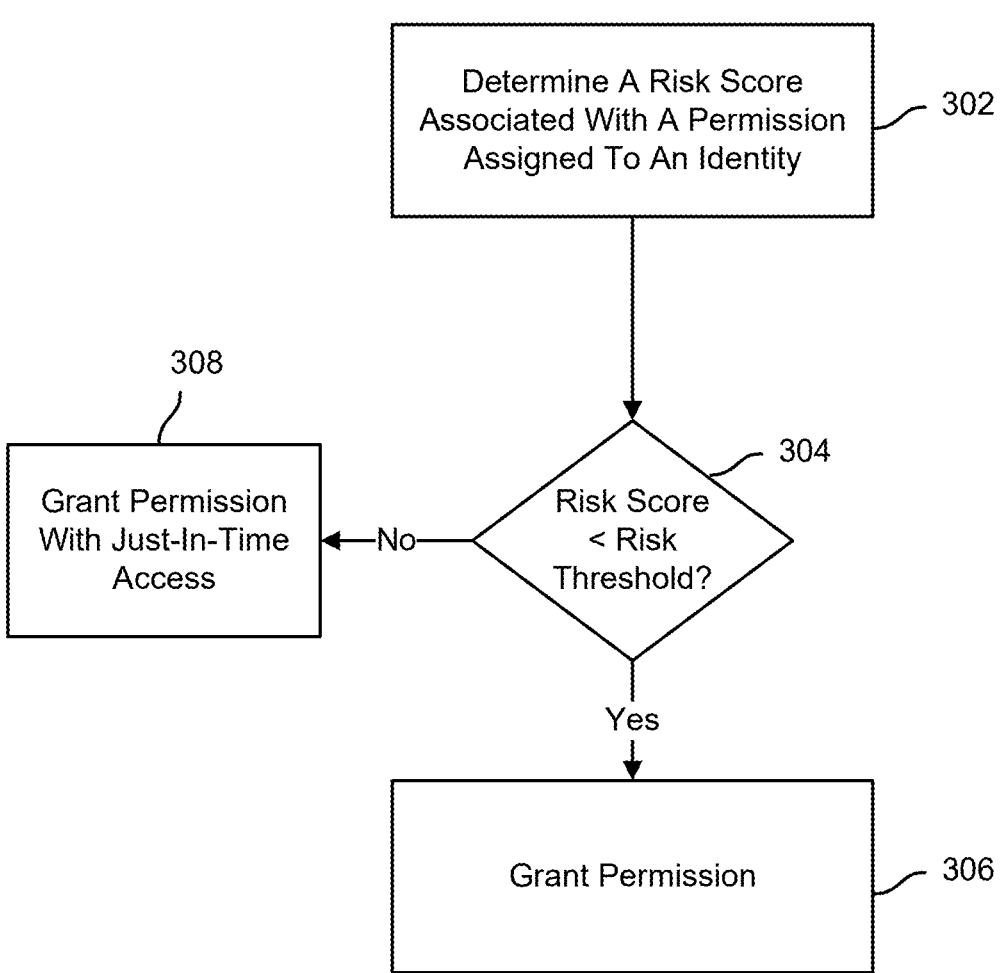
FIG. 3 is a flow diagram illustrating a process to grant permissions in accordance with some embodiments.

FIG. 3 is a flow diagram illustrating a process to grant permissions in accordance with some embodiments. In the example shown, process 300 may be implemented by an automated least privilege engine, such as automated least privilege engine 102. In some embodiments, process 300 is implemented to perform some or all of step 210 of process 200.

At 302, a risk score associated with a permission assigned to an identity is determined. A risk score associated with a permission is a numerical or categorical value that quantifies how dangerous or sensitive a given permission is in the context of a system, cloud environment, or application. The risk score is based on the excessive privilege score associated with the permission, one or more risk metrics associated with the permission, and usage associated with the permission.

At 304, it is determined whether the risk score is less than a risk threshold. In response to a determination that the risk score is less than the risk threshold, process 300 proceeds to 306. In response to a determination that the risk score is not less than the risk threshold, process 300 proceeds to 308.

At 306, permission is granted. The permission is added to a set of permissions.

At 308, permission is granted with just-in-time access. The permission is added to a set of permissions, but with just-in-time access. In some embodiments, the risk score is greater than the risk threshold and a second risk threshold. The permission may be removed from the set of permissions associated with the identity.

Figure 4:
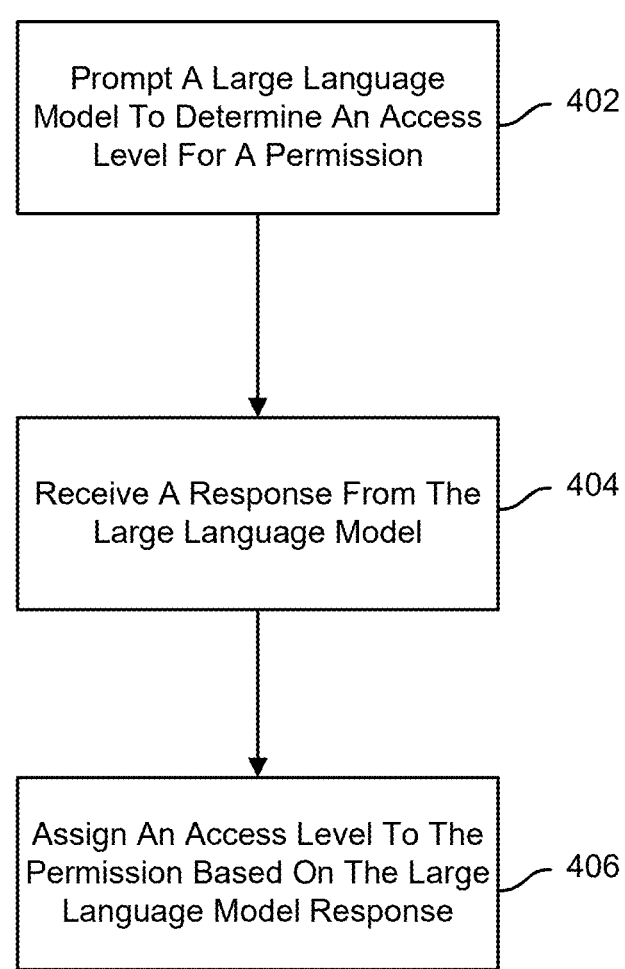
FIG. 4 is a flow diagram illustrating a process to determine an access level for a permission in accordance with some embodiments.

FIG. 4 is a flow diagram illustrating a process to determine an access level for a permission in accordance with some embodiments. In the example shown, process 400 may be implemented by an automated least privilege engine, such as automated least privilege engine 102. In some embodiments, process 400 is implemented to perform some or all of step 204 of process 200.

At 402, a large language model is prompted to determine an access level for a permission. A description of a permission and an instruction to determine an access level for the permission based on the permission description is provided to the large language model. The permission may be associated with a cloud provider or an application.

For example, the permission may be "s3: GetObject" and the permission description may be "Grants permission to retrieve objects from Amazon S3."

At 402, a response is received from the large language model. The large language model response maps the permission to a corresponding access level. The large language model response may include a justification for the access level.

At 404, an access level is assigned to the permission based on the large language model response. The access level included in the large language model may be utilized by an automated least privilege engine to determine an account risk associated with the permission, an identity risk, and an excessive privilege score.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:

a processor configured to:

determine a set of one or more permissions associated with an identity;

for each permission of the set of one or more permissions, determine one or more risk metrics that are calculated independently of historical usage, and determine corresponding usage of the one or more permissions associated with the identity; and modify access associated with at least one permission from the set of one or more permissions associated with the identity based on the one or more determined risk metrics and corresponding usage of the one or more permissions associated with the identity, including maintaining a first permission from the set of one or more permissions as standing access when the risk metrics associated with the permission are below a risk threshold, and converting a second permission from the set of one or more permissions from standing access to just-in-time access when the risk metrics associated with the second permission exceed the risk threshold and the corresponding usage indicates a need for the second permission; and a memory coupled to the processor and configured to provide the processor with instructions.

2. The system of claim 1, wherein the set of one or more permissions associated with the identity is an initial set of permissions.

3. The system of claim 1, wherein the set of one or more permissions associated with the identity is a previously determined least privilege set of permissions.

4. The system of claim 1, wherein the set of one or more permissions associated with the identity is determined according to a schedule, in response to a user command, or in response to an event.

5. The system of claim 1, wherein the set of one or more permissions associated with the identity includes one or more low privilege permissions after access associated with the at least one permission from the set of one or more permissions is modified.

6. The system of claim 1, wherein the one or more risk metrics that are calculated independently of historical usage are based in part on an account risk and an identity risk.

7. The system of claim 6, wherein the account risk is based on one or more of a permission risk, a policy risk, data sensitivity, and customer criticality.

8. The system of claim 7, wherein the permission risk is based in part on an access level associated with a permission.

9. The system of claim 8, wherein to determine the access level associated with the permission, the processor is configured to:

provide to a large language model a description of the permission and an instruction to determine the access level associated with the permission based on the permission;

receive a response from the large language model; and assign the access level associated with the permission to the permission based on the response.

10. The system of claim 6, wherein the identity risk is based on a posture risk metric, a behavior risk metric, and/or a privilege risk metric.

11. The system of claim 1, wherein the corresponding usage associated with the one or more permissions is based on cloud event log history, identity provider activity, and/or actions performed by the identity within an application after authentication.

12. The system of claim 1, wherein the processor is configured to determine an excessive privilege score based on the one or more risk metrics and the corresponding usage associated with the one or more permissions associated with the identity.

13. The system of claim 12, wherein the processor is configured to compare a risk score that is based on the excessive privilege score, the one or more risk metrics associated with the permission, and a corresponding usage associated with the permission to a risk threshold.

14. The system of claim 13, wherein the processor is configured to remove a permission from the set of one or more permissions in response to determining that the risk is not less than a risk threshold and a second risk threshold.

15. A method, comprising:

determining a set of one or more permissions associated with an identity;

for each permission of the set of one or more permissions, determining one or more risk metrics that are calculated independently of historical usage, and determining corresponding usage of the one or more permissions associated with the identity; and modifying access associated with at least one permission from the set of one or more permissions associated with the identity based on the one or more determined risk metrics and corresponding usage of the one or more permissions associated with the identity, including maintaining a first permission from the set of one or more permissions as standing access when the risk metrics associated with the permission are below a risk threshold, and converting a second permission from the set of one or more permissions from standing access to just-in-time access when the risk metrics associated with the second permission exceed the risk threshold and the corresponding usage indicates a need for the second permission.

16. The method of claim 15, wherein the set of one or more permissions associated with the identity includes one or more low privilege permissions after access associated with the at least one permission from the set of one or more permissions is modified.

17. The method of claim 15, wherein the one or more risk metrics are based in part on an account risk and an identity risk.

18. A computer program product embodied in a non-transitory computer readable medium and comprising computer instructions for:

determining a set of one or more permissions associated with an identity;

for each permission of the set of one or more permissions, determining one or more risk metrics that are calculated independently of historical usage, and determining corresponding usage of the one or more permissions associated with the identity; and modifying access associated with at least one permission from the set of one or more permissions associated with the identity based on the one or more determined risk metrics and corresponding usage of the one or more permissions associated with the identity, including maintaining a first permission from the set of one or more permissions as standing access when the risk metrics associated with the permission are below a risk threshold, and converting a second permission from the set of one or more permissions from standing access to just-in-time access when the risk metrics associated with the second permission exceed the risk threshold and the corresponding usage indicates a need for the second permission.

* * * * *